United States Patent
Tezuka et al.

(10) Patent No.: US 9,477,216 B2
(45) Date of Patent: Oct. 25, 2016

(54) NUMERICAL CONTROL DEVICE INCLUDING DISPLAY PART FOR DISPLAYING INFORMATION FOR EVALUATION OF MACHINING PROCESS

(71) Applicant: FANUC Corporation, Minamitsuru-gun, Yamanashi (JP)

(72) Inventors: Junichi Tezuka, Yamanashi (JP); Hajime Ogawa, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 638 days.

(21) Appl. No.: 13/901,725

(22) Filed: May 24, 2013

(65) Prior Publication Data

US 2013/0325166 A1 Dec. 5, 2013

(30) Foreign Application Priority Data

May 30, 2012 (JP) .................. 2012-123162

(51) Int. Cl.
*G06F 19/00* (2011.01)
*G05B 19/18* (2006.01)
*G05B 19/25* (2006.01)
*G05B 19/29* (2006.01)
*G05B 15/02* (2006.01)
*G05B 19/4068* (2006.01)

(52) U.S. Cl.
CPC .......... *G05B 15/02* (2013.01); *G05B 19/4068* (2013.01); *G05B 2219/35289* (2013.01); *G05B 2219/35353* (2013.01)

(58) Field of Classification Search
CPC .............. G05B 15/02; G05B 19/4068; G05B 2219/35289; G05B 2219/35353
See application file for complete search history.

(56) References Cited

U.S. PATENT DOCUMENTS

| | | | |
|---|---|---|---|
| 6,731,090 B1 * | 5/2004 | Tanaka | G05B 19/414 318/568.11 |
| 2011/0015877 A1 | 1/2011 | Okita et al. | |
| 2011/0057599 A1 * | 3/2011 | Iwashita | G05B 19/4068 318/601 |

FOREIGN PATENT DOCUMENTS

| | | |
|---|---|---|
| CN | 102402199 A | 4/2012 |
| DE | 102010017763 A1 | 2/2011 |
| DE | 102010044534 A1 | 3/2011 |
| JP | 04-177409 | 6/1992 |
| JP | 6-59717 A | 3/1994 |
| JP | 11-143514 | 5/1999 |
| JP | 2010-211554 A | 9/2010 |
| JP | 2011-22666 A | 2/2011 |
| JP | 2011-192017 | 9/2011 |

OTHER PUBLICATIONS

Weck, M., "Automatisierung von Maschinen und Anlagen," Werkzeugmaschinen, vol. 4, 5th newly revised edition, 2001, pp. 198-200, 323-328, and 341-342 (13 pages) with English machine translation (5 pages).

* cited by examiner

*Primary Examiner* — Mohammad Ali
*Assistant Examiner* — Md Azad
(74) *Attorney, Agent, or Firm* — Drinker Biddle & Reath LLP

(57) ABSTRACT

A numerical control device according to the present invention includes a display part for displaying a program coordinate and a command coordinate such that they can be compared with each other. The display part may be adapted to further display an actual coordinate. The display part may also be adapted to further display a program trajectory, a command trajectory and an actual trajectory, which are obtained from a machining program and the program coordinate, the command coordinate and the actual coordinate, respectively.

8 Claims, 11 Drawing Sheets

NUMERICAL CONTROL DEVICE INCLUDING DISPLAY PART FOR DISPLAYING INFORMATION FOR EVALUATION OF MACHINING PROCESS

RELATED APPLICATION DATA

This application claims priority under 35 U.S.C. §119 and/or §365 to Japanese Application No. 2012-123162 filed May 30, 2012, the entire contents of which is incorporated herein by reference.

BACKGROUND OF THE INVENTION

1. Field of the Invention

The present invention relates to a numerical control device including a display part for displaying information for evaluation of a machining process.

2. Description of the Related Art

A numerical control (NC) device is used for performing a desired machine process by driving a plurality of drive shafts of a machine tool in accordance with a machining program. The numerical control device is designed to calculate a command coordinate corresponding to a machining program (hereinafter referred to as a "program coordinate"), based on a command position of each drive shaft (hereinafter referred to as a "program position") which is included in the machining program and for which interpolation has yet to be carried out, and on machinery information of the machine tool (for example, a relative position of a machining point in the machine tool). A trajectory corresponding to the machining program (hereinafter referred to as a "program trajectory") is then obtained by connecting each coordinate with a given selected shape, such as straight lines or curves.

Interpolation is carried out based on the obtained program trajectory, a command velocity and other machining conditions, and a command coordinate after the interpolation (hereinafter referred to as a "command coordinate") is calculated. A command trajectory after the interpolation (hereinafter referred to as a "command trajectory") is then obtained by connecting each command coordinate after the interpolation with a given selected shape. Accordingly, interpolation which depends on a command velocity and other machining conditions is carried out in order to obtain the command trajectory in relation to the program trajectory, and the trajectories before and after the interpolation do not necessarily match each other. As a result, an expected shape sometimes cannot be obtained by machining. JP-A-6-59717 and JP-A-2011-22666 disclose a numerical control device including a display part for displaying trajectory data. However, a conventional evaluation method for evaluating a machining process includes comparing errors in shapes between a command trajectory after the interpolation and an actual trajectory of a tool. In addition, the evaluation method is mainly performed to check an adjustment effect of parameters which are set for the numerical control device in order to control movement of drive shafts. Therefore, if errors result from the interpolation or the machining program, it is difficult to identify the cause of the errors and find a solution thereto.

According to the present invention, a numerical control device including a display part for displaying necessary information to evaluate machining accuracy by taking into account changes in commands before and after interpolation is provided.

SUMMARY OF THE INVENTION

According to a first aspect, a numerical control device for controlling movement of a machining point by driving a plurality of drive shafts of a machine tool in accordance with a machining program is provided. The device comprises: a program position obtaining part for obtaining a program position from the machining program, the program position representing positional information for each drive shaft; a command position obtaining part for obtaining a command position of each drive shaft, the command position being generated based on the machining program and on a machining condition which is specified by the machining program and parameters; a program coordinate calculating part for calculating a program coordinate based on the program position and on machinery information of the machine tool, the program coordinate representing a coordinate of the machining point corresponding to the program position; a program coordinate storing part for storing the program coordinate; a command coordinate calculating part for calculating a command coordinate based on the command position and the machinery information of the machine tool, the command coordinate representing a coordinate of the machining point corresponding to the command position; a command coordinate storing part for storing the command coordinate; and a display part for displaying the program coordinate and the command coordinate such that the program coordinate and the command coordinate can be compared with each other.

According to the first aspect, the display part displays the program coordinate which is a command coordinate before the interpolation is carried out and the command coordinate which is a command coordinate after the interpolation such that they can be compared with each other. This allows an operator to visually check how the coordinates change before and after the interpolation. Therefore, the operator can determine whether or not errors in a shape formed by machining have resulted from the interpolation.

According to a second aspect, the numerical control device according to the first aspect further comprises: an actual position obtaining part for obtaining an actual position of each drive shaft by detecting a position of each drive shaft; an actual coordinate calculating part for calculating an actual coordinate based on the actual position and the machinery information of the machine tool, the actual coordinate representing a coordinate of the machining point corresponding to the actual position; and an actual coordinate storing part for storing the actual coordinate, wherein the display part is adapted to further display the actual coordinate such that the actual coordinate can be compared with the program coordinate and the command coordinate.

According to the second aspect, the display part displays the actual coordinate through which the tool actually passes through, in addition to the program coordinate and the command coordinate, such that they can be compared with one another. Therefore, if errors occur in a shape formed by machining, an operator can precisely determine whether the errors have resulted from the interpolation, from the machining program or from the parameter settings.

According to a third aspect, the numerical control device according to the first aspect further comprises: a program trajectory generating part for generating a program trajectory by connecting the program coordinates with a predetermined shape; and a command trajectory generating part for generating a command trajectory by connecting the command coordinates with a predetermined shape, wherein the display part is adapted to further display the program trajectory and the command trajectory such that the program trajectory and the command trajectory can be compared with each other.

According to the third aspect, the display part displays the program trajectory and the command trajectory, in addition to the program coordinate and the command coordinate, such that they can be compared with each other. With the trajectories before and after the interpolation displayed, an operator can easily check changes in commands before and after the interpolation.

According to a fourth aspect, the numerical control device according to the third aspect further comprises: an actual position obtaining part for obtaining an actual position of each drive shaft by detecting a position of each drive shaft; an actual coordinate calculating part for calculating an actual coordinate based on the actual position and the machinery information of the machine tool, the actual coordinate representing a coordinate of the machining point corresponding to the actual position; an actual coordinate storing part for storing the actual coordinate; and an actual trajectory generating part for generating an actual trajectory by connecting the actual coordinates with a predetermined shape, wherein the display part is adapted to further display the actual trajectory such that the actual trajectory can be compared with the program trajectory and the command trajectory.

According to the fourth aspect, the display part displays the actual coordinate and the actual trajectory, in addition to the program coordinate, the command coordinate, the program trajectory and the command trajectory, such that they can be compared with each other. Therefore, if errors occur in a shape formed by machining, an operator can precisely and easily determine whether the errors have resulted from the interpolation, from the machining program or from the parameter settings.

According to a fifth aspect, a numerical control device for controlling movement of a machining point by driving a plurality of drive shafts of a machine tool in accordance with a machining program is provided. The device comprises: a program position obtaining part for obtaining a program position from the machining program, the program position representing positional information for each drive shaft; a command position obtaining part for obtaining a command position of each drive shaft, the command position being generated based on the machining program and on a machining condition which is specified by the machining program and parameters; a program coordinate calculating part for calculating a program coordinate based on the program position and on machinery information of the machine tool, the program coordinate representing a coordinate of the machining point corresponding to the program position; a program coordinate storing part for storing the program coordinate; a command coordinate calculating part for calculating a command coordinate based on the command position and the machinery information of the machine tool, the command coordinate representing a coordinate of the machining point corresponding to the command position; a command coordinate storing part for storing the command coordinate; a program trajectory generating part for generating a program trajectory by connecting the program coordinates with a predetermined shape; and a command trajectory generating part for generating a command trajectory by connecting the command coordinates with a predetermined shape, wherein the display part is adapted to display the program trajectory and the command trajectory such that the program trajectory and the command trajectory can be compared with each other.

According to the fifth aspect, the display part displays the program trajectory and the command trajectory such that they can be compared with each other. This allows an operator to easily check changes in commands before and after the interpolation.

According to a sixth aspect, the numerical control device according to the fifth aspect further comprises: an actual position obtaining part for obtaining an actual position of each drive shaft by detecting a position of each drive shaft; an actual coordinate calculating part for calculating an actual coordinate based on the actual position and the machinery information of the machine tool, the actual coordinate representing a coordinate of the machining point corresponding to the actual position; an actual coordinate storing part for storing the actual coordinate; and an actual trajectory generating part for generating an actual trajectory by connecting the actual coordinates with a predetermined shape, wherein the display part is adapted to further display the actual trajectory such that the actual trajectory can be compared with the program trajectory and the command trajectory.

According to the sixth aspect, the display part displays the actual trajectory, in addition to the program trajectory and the command trajectory such that they can be compared with one another. Therefore, if errors occur in a shape formed by machining, an operator can precisely and easily determine whether the errors have resulted from the interpolation, from the machining program or from the parameter settings.

According to a seventh aspect, the numerical control device according to the third or fifth aspect further comprises a distance calculating part for calculating a distance between a first selected point on the program trajectory and a second selected point on the command trajectory, wherein the display part is adapted to further display the distance.

According to the seventh aspect, the display part further displays the distance between the two selected points on the program trajectory and the command trajectory, respectively. This allows an operator to quantitatively determine errors in the trajectories before and after the interpolation.

According to an eighth aspect, the numerical control device according to the fourth or sixth aspect further comprises a distance calculating part for calculating a distance between a first selected point on a first trajectory selected from the program trajectory, the command trajectory and the actual trajectory by an external input device and a second selected point on a second trajectory different from the first trajectory, wherein the display part is adapted to further display the distance.

According to the eighth aspect, the display part further displays the distance between the two selected points on two trajectories which are selected from the program trajectory, the command trajectory and the actual trajectory. This allows an operator to quantitatively determine errors between two given trajectories.

According to a ninth aspect, the numerical control device according to the third or fifth aspect further comprises a distance calculating part for calculating a distance along a perpendicular line which extends from a selected point on one of the program trajectory and the command trajectory to a point where the perpendicular line crosses the other trajectory, the selected point being selected by an external input device, wherein the display part is adapted to further display the perpendicular line and the distance.

According to the ninth aspect, the display part displays a length of the perpendicular line as the distance between the two trajectories, the perpendicular line extending from a selected point on one of the program trajectory and the command trajectory to a point where the perpendicular line crosses the other trajectory. This allows an operator to quantitatively determine errors between two given trajectories.

According to a tenth aspect, the numerical control device according to the fourth or sixth aspect further comprises a distance calculating part for calculating a distance along a perpendicular line which extends from a selected point on a first trajectory which is one of the program trajectory, the command trajectory and the actual trajectory selected by an external input device to a point where the perpendicular line crosses a second trajectory different from the first trajectory, wherein the display part is adapted to further display the perpendicular line and the distance.

According to the tenth aspect, the display part displays a length of the perpendicular line as the distance between the two trajectories, the perpendicular line extending from a selected point on one of the program trajectory, the command trajectory and the actual trajectory to a point where the perpendicular line crosses another given trajectory. This allows an operator to quantitatively determine errors between two given trajectories.

These and other objects, features and advantages of the present invention will become more apparent in light of the detailed description of exemplary embodiments thereof as illustrated by the drawings.

DETAILED DESCRIPTION

Figure 1:
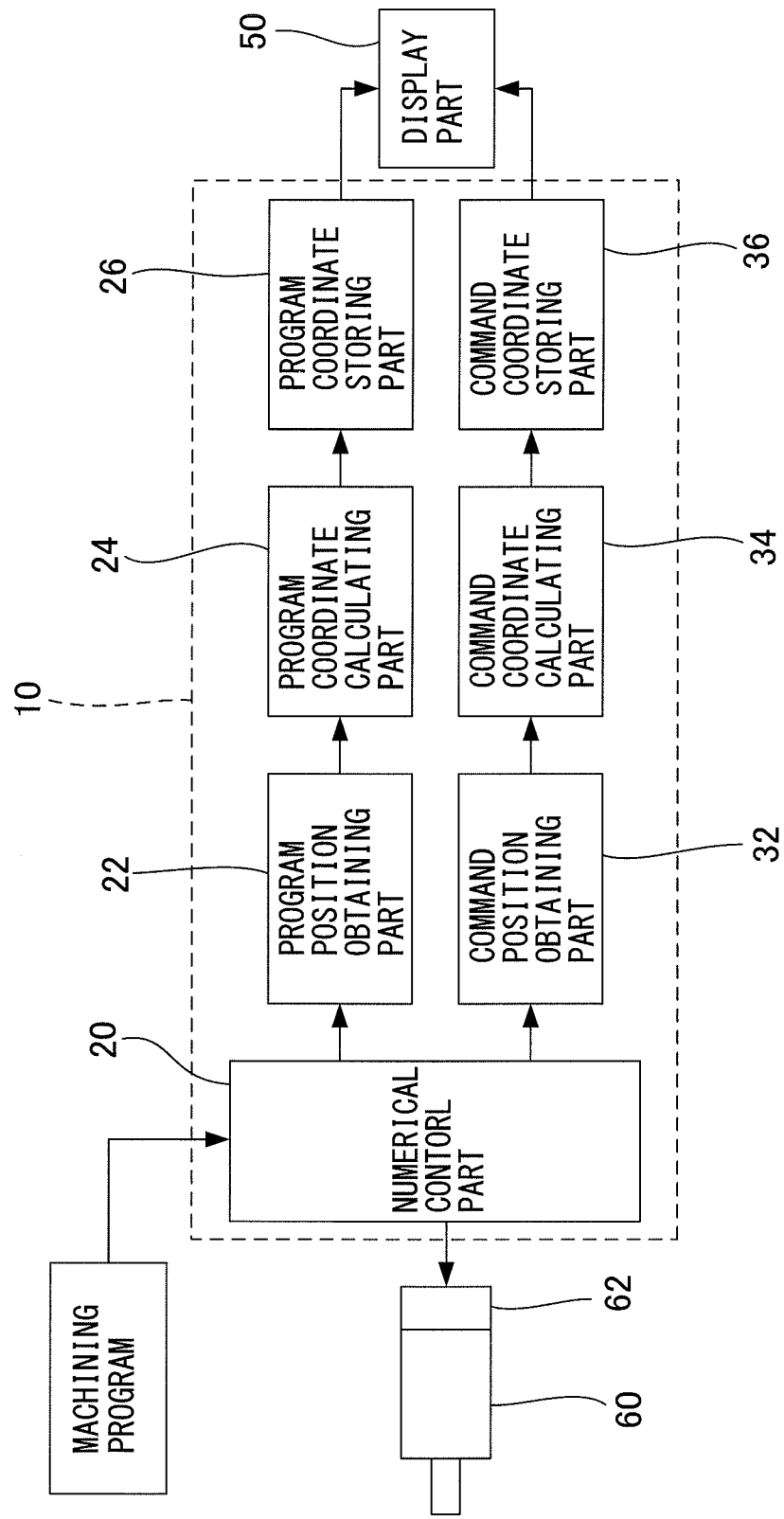
FIG. 1 is a block diagram illustrating a configuration of a numerical control device according to a first embodiment of the present invention.

Embodiments of the present invention will be described below with reference to the accompanying drawings. FIG. 1 is a block diagram illustrating a configuration of a numerical control device 10 according to a first embodiment of the present invention. The numerical control device 10 includes a numerical control part 20, a program position obtaining part 22, a program coordinate calculating part 24, and a program coordinate storing part 26, a command position obtaining part 32, a command coordinate calculating part 34, and a command coordinate storing part 36. The numerical control device 10 controls movement of a machine tool by sending a command of numerical information relating to a moving path, a feeding velocity of the machining point of the machine tool and other machining procedures, in accordance with a machining program and parameters.

In accordance with the machining program, the numerical control part 20 creates a control command for driving an electric motor 60 which provides power to drive shafts of a machine tool, which is not shown, such as a lathe and a machining center. The machining program includes various information which is written in a certain format such as G-code and is generated based on a workpiece shape created by software such as CAD/CAM. For example, the information may include a command position and a command velocity for each drive shaft. The machining program may also include further information such as shape data, which are used to generate a trajectory by connecting coordinates. The numerical control part 20 reads a program position representing a command position for each drive shaft before interpolation. The program position is specified by the machining program. The numerical control part 20 also calculates a program coordinate representing a command coordinate before interpolation, based on the program position and machinery information. The machinery information represents a relative position of a machining point of the machine tool such as a tip of tool. Thus, the program coordinate represents a command coordinate of the machining point before the interpolation specified by the machining program.

The numerical control part 20 generates a program trajectory representing a command trajectory before the interpolation, by connecting each coordinate with straight lines or curves such as circular arcs in accordance with shape data specified by the machining program. The numerical control part 20 performs the interpolation to create a command pulse for each drive shaft, based on the program trajectory, a command velocity specified by the machining program and an acceleration/deceleration time constant specified by parameters or the like. In order to create the command pulse for each drive shaft, a command coordinate after the interpolation, to which the machining point should be moved, is calculated for each control cycle.

The numerical control part 20 creates a command pulse for each drive shaft by distributing an amount of movement necessary for each control cycle, based on the calculated command coordinate after the interpolation. The command pulse is converted to a current command for driving the electric motor 60 through a servo control part, which is not shown. It should be noted that although only one electric motor 60 is shown in FIG. 1 and other drawings for simplification, five electric motors 60 may be provided, for example, in the case where five axes control is preferred. The electric motors 60 are controlled by the numerical control part 20 independently of one another. The electric motor 60 is provided with a detector 62 such as an encoder, so as to detect a position and velocity of the electric motor 60.

The program position obtaining part 22 obtains the program position from the numerical control part 20. The program coordinate calculating part 24 calculates a program coordinate based on the program position and on the machinery information in a similar way as the calculation by the numerical control part 20. Alternatively, the program coordinate calculating part 24 may also obtain the program coordinate by reading the result of the calculation by the numerical control part 20. The program coordinate calculated or obtained as described above is stored by the program coordinate storing part 26.

The command position obtaining part 32 obtains the command position after the interpolation from the numerical control part 20. Specifically, the command position obtaining part 32 obtains the command position which is a value obtained by multiplying a detection unit (an amount of movement per unit pulse) and an accumulated value of amplitudes of the command pulses created by the numerical control part 20 in order to drive the electric motor 60. The command coordinate calculating part 34 calculates the command coordinate based on the command position obtained by the command position obtaining part 32 and on the machinery information in a similar manner as the calculation of the program coordinate. The command coordinate calculated by the command coordinate calculating part 34 is stored in the command coordinate storing part 36.

As described above, the command coordinate depends on machining conditions such as a velocity. For example, if the command velocity is relatively large, a distance between the command coordinates becomes large. On the other hand, if the command velocity is relatively small, a distance between the command coordinates becomes small. Accordingly, a trajectory generated by connecting the command coordinates with straight lines varies depending on the command velocity. This could results in errors in a shape formed by machining.

Therefore, the numerical control device 10 according to the present embodiment further includes a display part 50 for reading the program coordinate out of the program coordinate storing part 26 and the command coordinate out of the command coordinate storing part 36, respectively.

The display part 50 displays the program coordinate and the command coordinate on a monitor (not shown) or the like by outputting a display signal.

Figure 2:
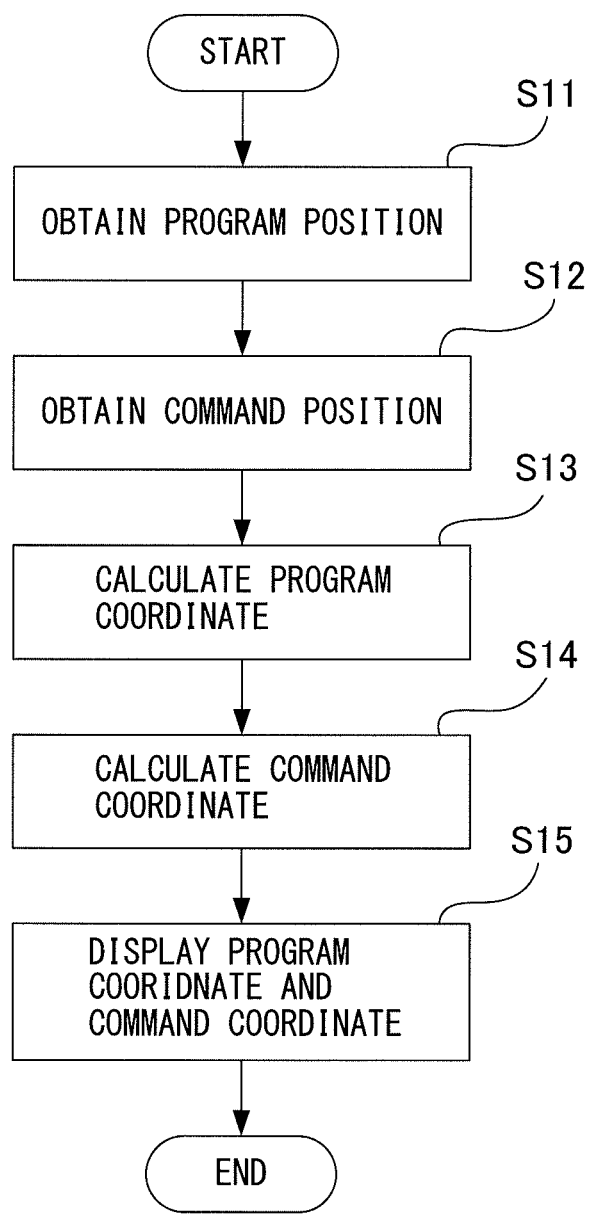
FIG. 2 is a flow chart showing a display process performed by the numerical control device shown in FIG. 1.

FIG. 2 is a flow chart showing a display process performed by the numerical control device 10 shown in FIG. 1. First of all, the numerical control device 10 activates the program position obtaining part 22 to obtain a program position from the numerical control part 20 (step S11). The program position is a command position (command position before interpolation) included in a machining program which is read by the numerical control part 20. The numerical control device 10 then activates the command position obtaining part 32 to obtain a command position (step S12). The command position is calculated based on a command pulse created by the numerical control part 20. Subsequently, the numerical control device 10 activates the program command calculating part 24 to calculate a program coordinate (S13). The program coordinate is calculated based on the program position obtained at step S11 and on the machinery information. The calculated program coordinate is stored in the program coordinate storing part 26. The numerical control device 10 further activates the command coordinate calculating part 34 to calculate a command coordinate (step S14). The command coordinate is calculated based on the command position obtained at step S12 and on the machinery information. The calculated command coordinate is stored in the command coordinate storing part 36. Finally, the numerical control device 10 activates the display part 50 to display the program coordinate and the command coordinate on a monitor or the like (step S15).

Figure 9:
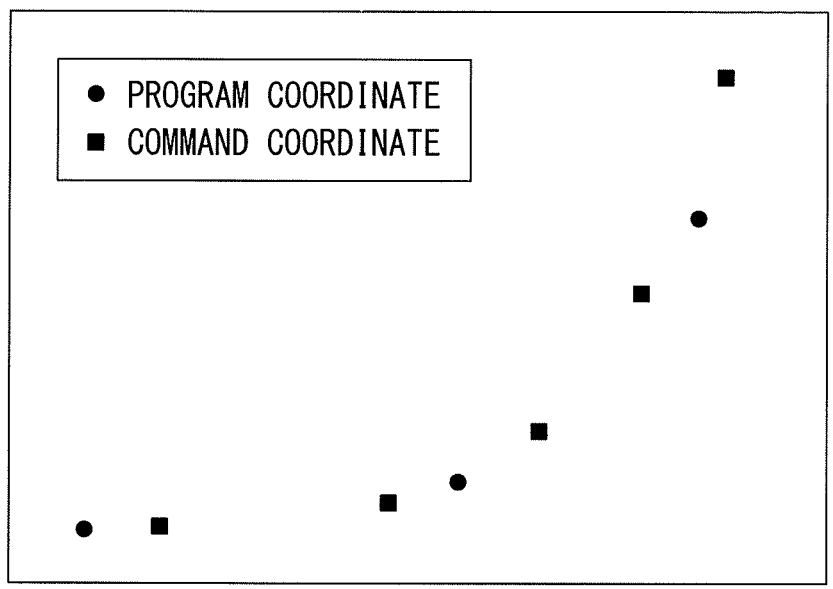
FIG. 9 shows an exemplary display by a display part of the numerical control device according to the first embodiment.

FIG. 9 shows an exemplary display by the display part 50 of the numerical control device 10 according to the first embodiment. The illustrated black circles represent positions of the program coordinates obtained at step S13. The illustrated black squares represent positions of the command coordinates obtained at step S14. As shown in FIG. 9, the display part 50 according to the embodiment displays the program coordinates and the command coordinates in a superimposed manner, such that the program coordinates and the command coordinates can be compared with each other. Therefore, when errors occur in a shape formed by machining, an operator can judge whether or not the errors have resulted from the interpolation by checking an image on a monitor displayed by the display part 50.

Other embodiments of the present invention different from the above-described embodiment will be described below. In the following explanation, matters that have already been described will be omitted. The same or corresponding elements will be designated with the same referential numerals.

Figure 3:
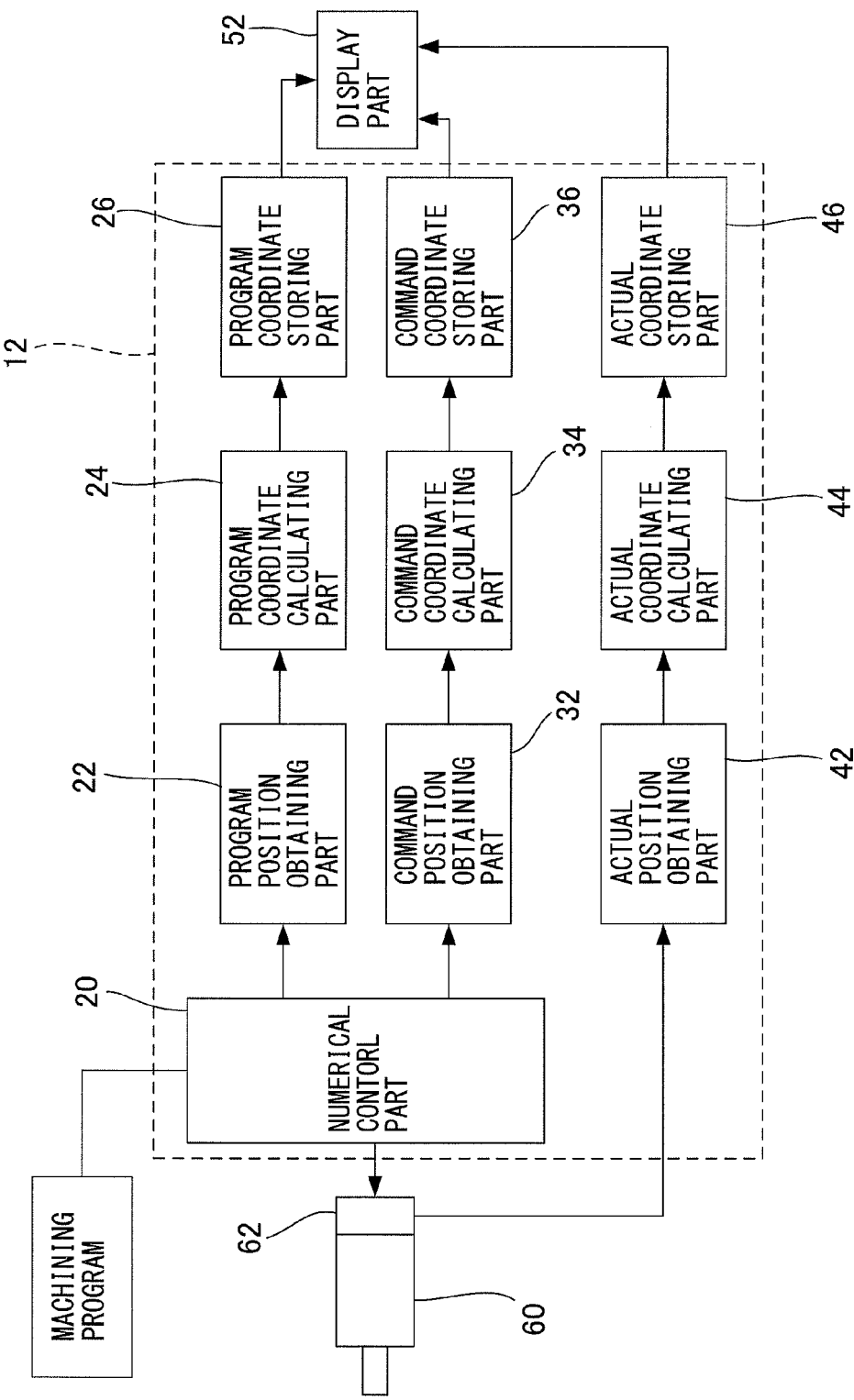
FIG. 3 is a block diagram illustrating a configuration of a numerical control device according to a second embodiment of the present invention.

FIG. 3 is a block diagram illustrating a configuration of a numerical control device 12 according to a second embodiment of the present invention. In addition to the configuration of the numerical control device 10 according to the first embodiment, the numerical control device 12 further includes an actual position obtaining part 42, an actual coordinate calculating part 44, and an actual coordinate storing part 46.

The actual position obtaining part 42 obtains a position of the electric motor 60, which is detected by the detector 62 of the electric motor 60. Thus, the position represents an actual position of a drive shaft. Alternatively, the position of the drive shaft can be obtained by multiplying an accumulated value of position feedbacks from the numerical control part 20 with a detection unit (amount of movement per a pulse unit). The actual coordinate calculating part 44 calculates an actual coordinate of a machining point, based on an actual position obtained or calculated by the actual position obtaining part 42 and on the machinery information. The actual coordinate storing part 46 stores the actual coordinate calculated by the actual coordinate calculating part 44.

Figure 4:
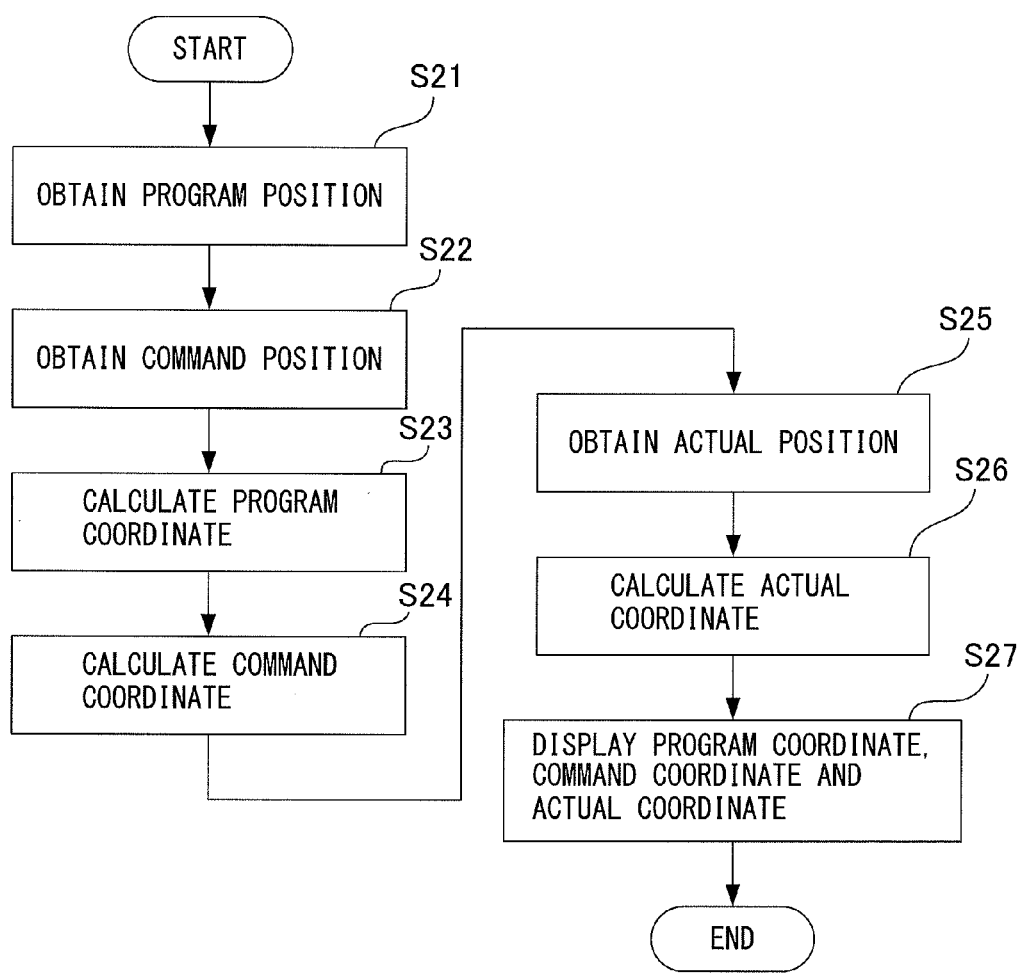
FIG. 4 is a flow chart showing a display process performed by the numerical control device shown in FIG. 3.

FIG. 4 is a flow chart showing a display process performed by the numerical control device 12 shown in FIG. 3. Since processes at steps S21 to S24 are the same as the processes at steps S11 to S14 according to the first embodiment that have been described in relation to FIG. 2, a further explanation thereon will be omitted. According to the present embodiment, following step S24, the numerical control device 12 activates the actual position obtaining part 42 to obtain an actual position from the detector 62 or calculate an actual position with the aid of the numerical control part 20 (step S25). The numerical control device 12 then activates the actual coordinate calculating part 44 to calculate an actual coordinate (step S26). The actual coordinate calculated at step S26 is stored in the actual coordinate storing part 46. Finally, the numerical control device 12 activates the display part 52 to display the program coordinate, the command coordinate and the actual coordinate on a monitor or the like (step S27).

Figure 10:
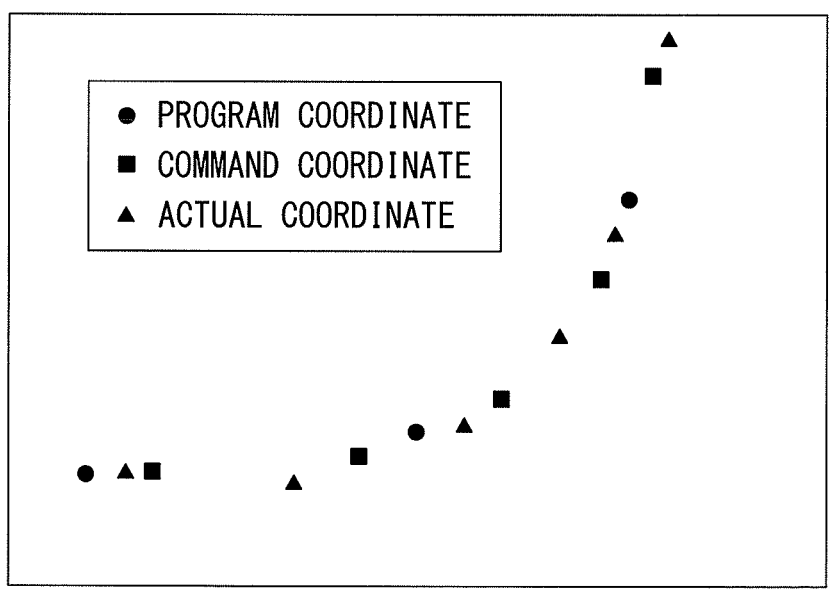
FIG. 10 shows an exemplary display by a display part of the numerical control device according to the second embodiment.

FIG. 10 shows an exemplary display by the display part 52 of the numerical control device 12 according to the second embodiment. The illustrated black circles represent positions of the program coordinates obtained at step S23. The illustrated black squares represent positions of the command coordinates obtained at step S24. The illustrated black triangles represent positions of the actual coordinates obtained at step S26. As shown in FIG. 10, the display part 52 according to the present embodiment displays the actual coordinate, in addition to the program coordinate and the command coordinate, in a superimposed manner, such that the program coordinate, the command coordinate and the actual coordinate can be compared with one another. Therefore, when errors occur in a shape formed by machining, an operator can judge at once whether the errors have resulted from the interpolation or from the machining program or other parameter settings by checking an image on a monitor displayed by the display part 52.

Figure 5:
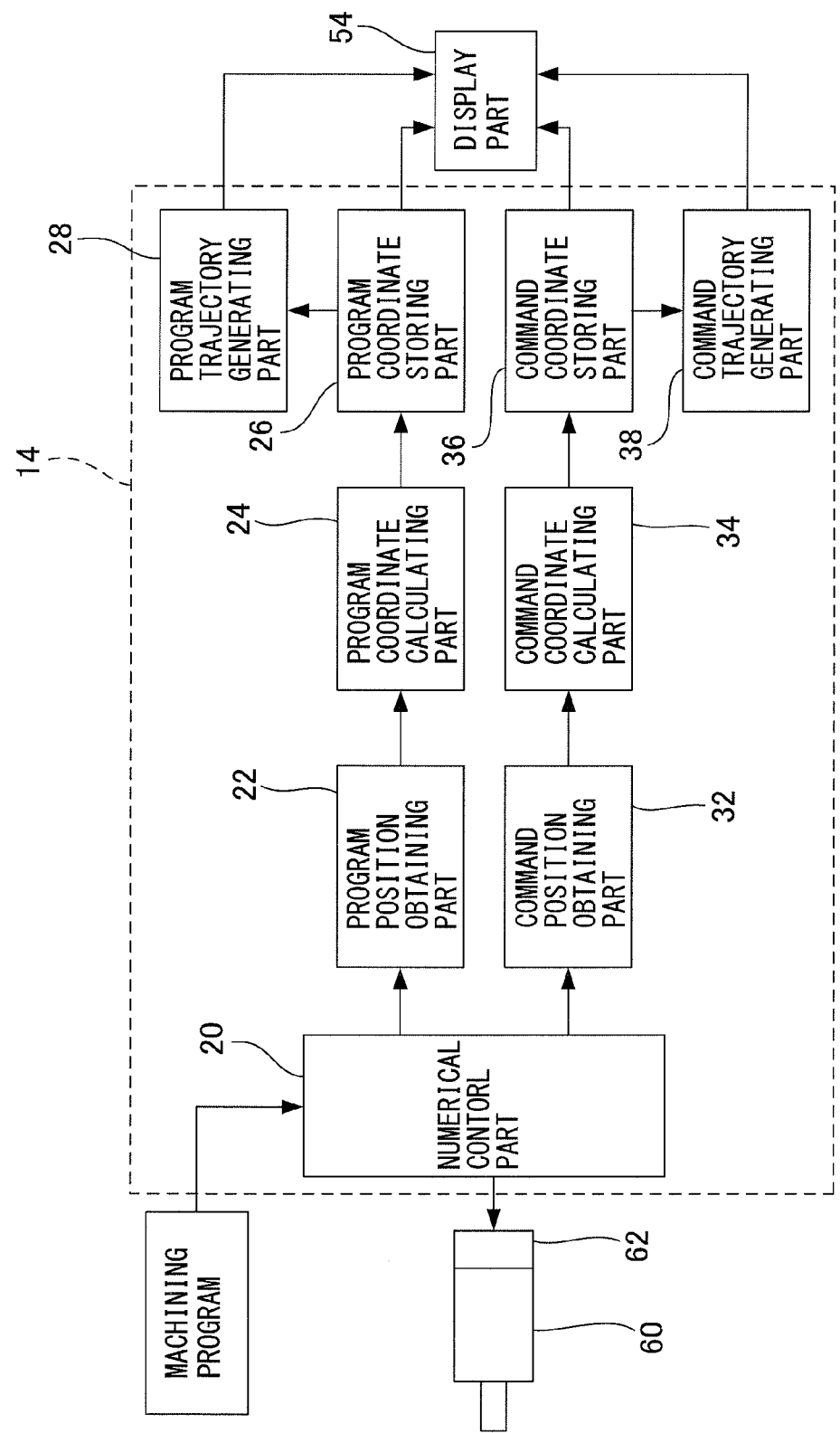
FIG. 5 is a block diagram illustrating a configuration of a numerical control device according to a third embodiment of the present invention.

FIG. 5 is a block diagram illustrating a configuration of a numerical control device 14 according to a third embodiment of the present invention. In addition to the configuration of the numerical control device 10 according to the first embodiment, the numerical control device 14 further includes a program trajectory generating part 28 and a command trajectory generating part 38. The program trajectory generating part 28 generates a program trajectory by connecting the program coordinates stored in the program coordinate storing part 26 with a predetermined shape specified by the machining program, such as straight lines and curves such as a circular arc.

The command trajectory generating part 38 generates a command trajectory by connecting the command coordinates stored in the command coordinates storing part 36 with a predetermined shape such as straight lines and curves such as a circular arc.

Figure 6:
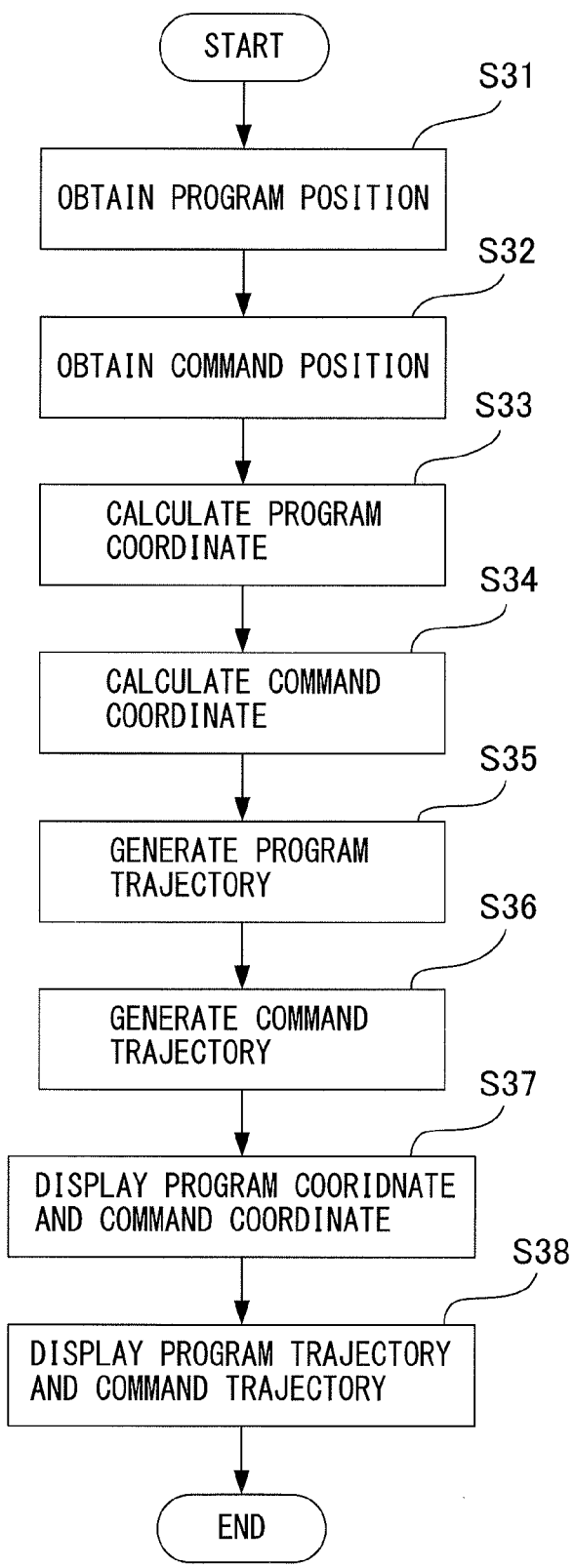
FIG. 6 is a flow chart showing a display process performed by the numerical control device shown in FIG. 5.

FIG. 6 is a flow chart showing a display process performed by the numerical control device 14 shown in FIG. 5. Since processes at steps S31 to S34 are the same as the processes at steps S11 to S14 in the first embodiment that have been described in relation to FIG. 2, a further explanation thereon will be omitted. In this embodiment, following steps S34, the numerical control device 14 activates the program trajectory generating part 28 to generate a program trajectory (step S35). Further, the numerical control device 14 activates the command trajectory generating part 38 to generate a command trajectory (step S36). The numerical control device 14 then activates the display part 54 to display the program coordinate and the command coordinate on a monitor or the like (step S37). The numerical control device 14 then activates the display part 54 to display the program trajectory and the command trajectory on a monitor or the like (step S38).

Figure 11:
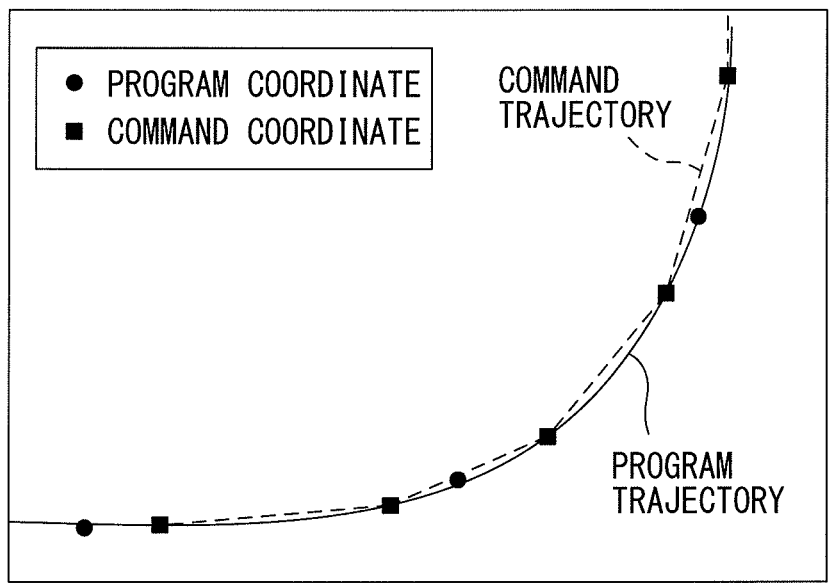
FIG. 11 shows an exemplary display by a display part of the numerical control device according to the third embodiment.

FIG. 11 shows an exemplary display by the display part 54 of the numerical control device 14 according to the third embodiment. The illustrated solid line represents the program trajectory generated at step S35. The illustrated dashed line represents the command trajectory generated at step S36. As shown in FIG. 11, the display part 54 according to the present embodiment displays the program trajectory and the command trajectory, in addition to the program coordinate and the command coordinate, in a superimposed manner such that the program trajectory and the command trajectory can be compared with each other. Therefore, when errors occur in a shape formed by machining, an operator can easily judge whether or not the errors have resulted from the interpolation by checking an image on a monitor displayed by the display part 54.

Figure 7:
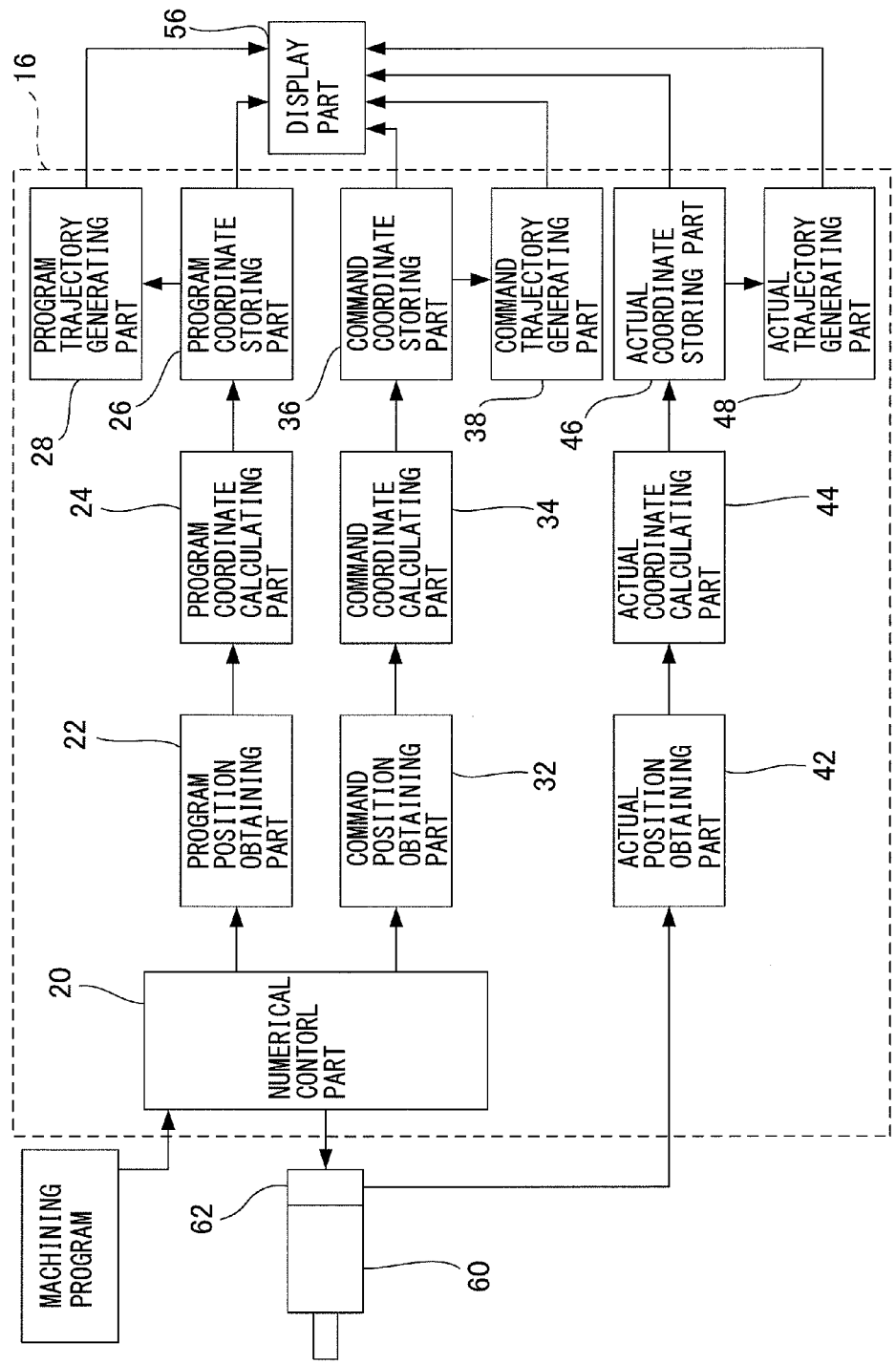
FIG. 7 is a block diagram illustrating a configuration of a numerical control device according to a fourth embodiment of the present invention.

FIG. 7 is a block diagram illustrating a configuration of a numerical control device 16 according to a fourth embodiment of the present invention. In addition to the configuration of the numerical control device 14 according to the third embodiment, the numerical control device 16 further includes an actual position obtaining part 42, an actual coordinate calculating part 44, an actual coordinate storing part 46 and an actual trajectory generating part 48. Since the actual position obtaining part 42, the actual coordinate calculating part 44 and the actual coordinate storing part 46 function in the same way as those of the numerical control device 12 according to the second embodiment, a further explanation thereon will be omitted.

The actual trajectory generating part 48 generates an actual trajectory by connecting the actual coordinates stored in the actual coordinates storing part 46 with a predetermined shape such as straight lines and curves such as a circular arc.

Figure 8:
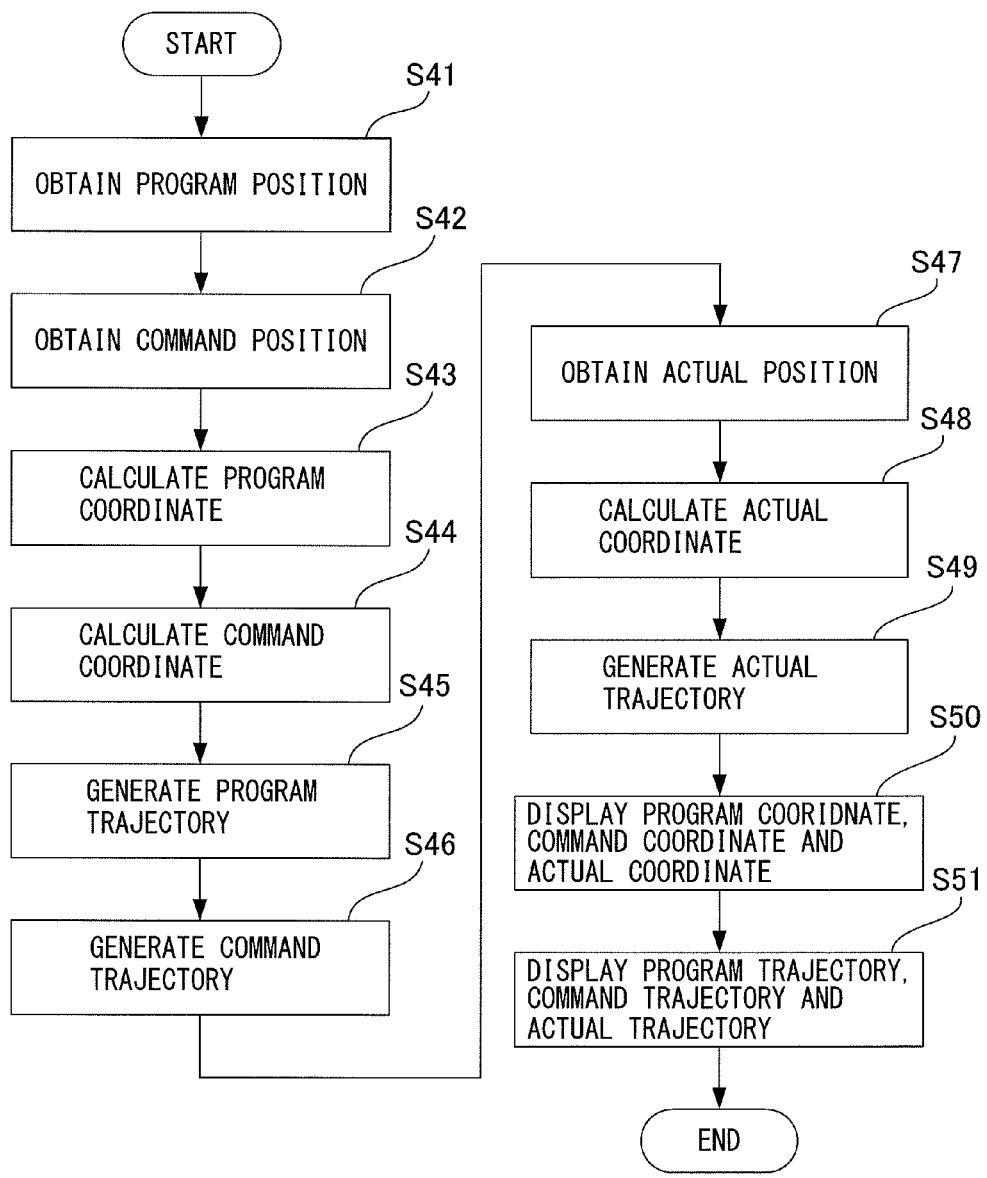
FIG. 8 is a flow chart showing a display process performed by the numerical control device shown in FIG. 7.

FIG. 8 is a flow chart showing a display process performed by the numerical control device 16 shown in FIG. 7. Since processes at steps S41 to S46 are the same as the processes at steps S31 to S36 according to the third embodiment that have been described in relation to FIG. 6, a further explanation thereon will be omitted. According to the present embodiment, following step S46, the numerical control device 16 obtains an actual position at step S47 and calculates an actual coordinate at step S48. Since processes at steps S47 and S48 are the same as those at steps S25 and S26 in the second embodiment that have been described in relation to FIG. 4, a further explanation thereon will be omitted. The numerical control device 16 then activates the display part 56 to display the program coordinate, the command coordinate and the actual coordinate on a monitor or the like (step S50). In addition, the numerical control device 16 activates the display part 56 to display the program trajectory, the command trajectory and the actual trajectory on a monitor or the like (step S51).

Figure 12:
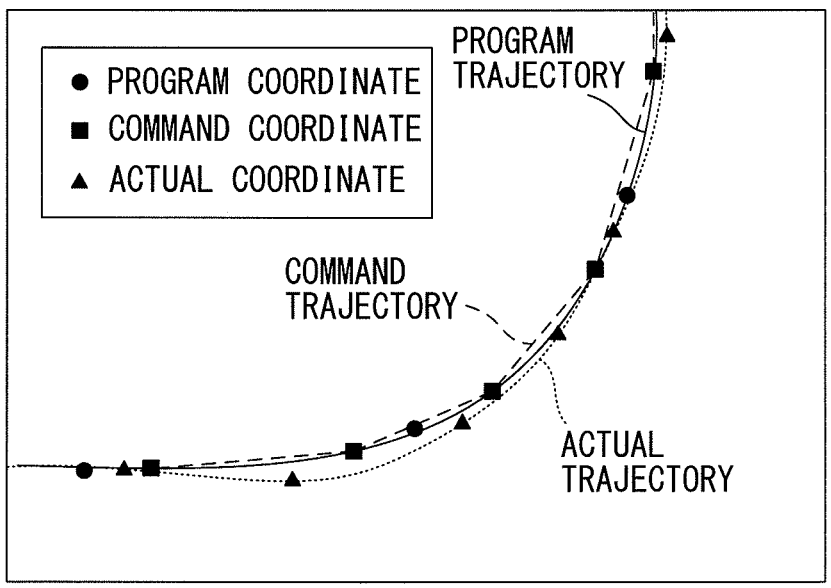
FIG. 12 shows an exemplary display by a display part of the numerical control device according to the fourth embodiment.

FIG. 12 shows an exemplary display by the display part 56 of the numerical control device 16 according to the fourth embodiment. The illustrated solid line represents the program trajectory generated at step S45. The illustrated dashed line represents the command trajectory generated at step S46. The illustrated dotted line represents the actual trajectory generated at step S49. As shown in FIG. 12, the display part 56 according to the present embodiment displays the program trajectory, the command trajectory and the actual trajectory, in addition to the program coordinate, the command coordinate and the actual coordinate, in a superimposed manner such that the respective coordinates and the respective trajectories can be compared with one another. Therefore, when errors occur in a shape formed by machining, an operator can easily judge at once whether the errors have resulted from the interpolation or from the machining program or other parameter settings by checking an image on a monitor displayed by the display part 56.

Figure 13:
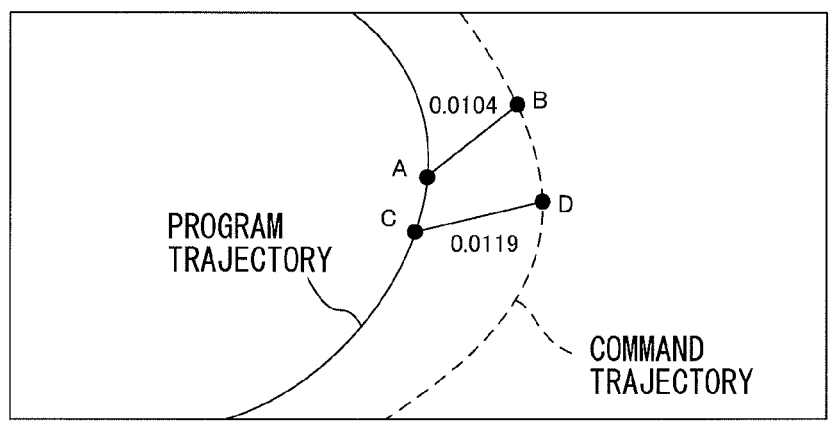
FIG. 13 shows an exemplary display by a display part of a numerical control device according to a first variant of the present invention.

FIG. 13 shows an exemplary display by a display part of a numerical control device according to a first variant of the present invention. The numerical control device according to this variant further includes a distance calculating part for calculating a distance between two given points on trajectories which are selected by an external input device. The external input device may be a widely-known input device such as a mouse and a keyboard. In FIG. 13, if a point A on a program trajectory and a point B on a command trajectory are selected, for example, a distance in a straight line of "0.0104 mm" between the points A and B is displayed on a monitor by the display part. In another example in which a point C on the program trajectory and point D on the command trajectory are selected, a distance in a straight line of "0.0119 mm" is displayed on the monitor by the display part.

As such, with a distance between any given selected points displayed, an operator can quantitatively determine errors occurring between the two trajectories. Such quantitative information can be used to correct the machining program or adjust the servo controller. Although the example in which the program trajectory and the command trajectory are displayed has been described, the same principle can be applied to another embodiment in which an actual trajectory is additionally displayed. In the latter case, a distance between a first selected point on a first trajectory selected from the program trajectory, the command trajectory and the actual trajectory and a second selected point on a second trajectory different from the first trajectory is calculated and displayed on the monitor.

Figure 14:
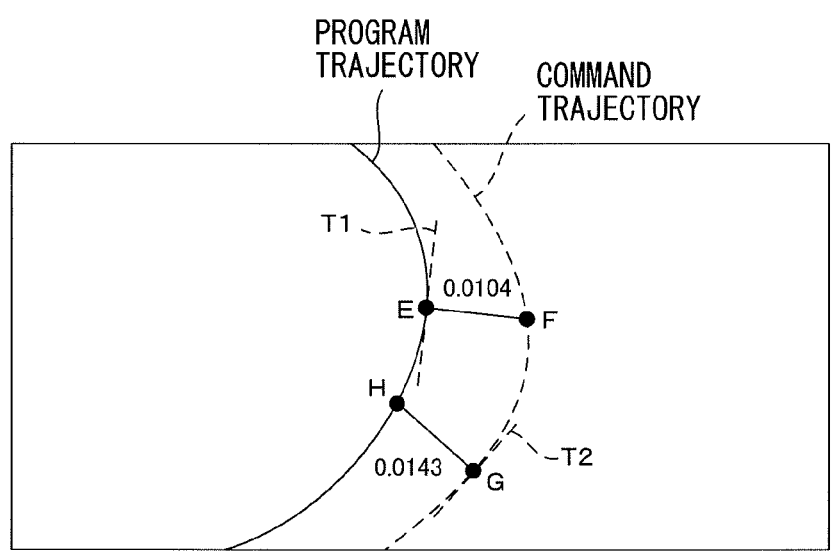
FIG. 14 shows an exemplary display by a display part of a numerical control device according to a second variant of the present invention.

FIG. 14 shows an exemplary display by a display part of a numerical control device according to a second variant of the present invention. The numerical control device in this variant further includes a distance calculating part for calculating a distance in a perpendicular line extending from a given point on a trajectory selected by an external input device to a point where it crosses other trajectory. The external input device may be a widely-known input device such as a mouse and a keyboard. In FIG. 14, if a point E on the program trajectory is selected by way of example, a line perpendicular to a tangential line T1 extending through the point E is provided. Then, a distance in a straight line of "0.0104 mm" between the point E and a point F where the perpendicular line crosses the command trajectory is displayed on the monitor by the display part. In another example in which a point G on the command trajectory is selected, a line perpendicular to a tangential line T2 extending through the point G is provided. Then, a distance in a straight line of "0.0143 mm" between the point G and a point H where the perpendicular line crosses the program trajectory is displayed on the monitor by the display part.

As described above, with a distance between the trajectories connected by a perpendicular line extending from a given selected point, an operator can quantitatively determine errors occurring between the two trajectories. Such quantitative information can be used to correct the machining program or adjust the servo controller. Although the example in which the program trajectory and the command trajectory are displayed has been described, the same principle can be applied to another embodiment in which an actual trajectory is additionally displayed. In the latter case, a distance in a perpendicular line extending from a first selected point on a first trajectory selected from the program trajectory, the command trajectory and the actual trajectory to a point where it crosses a second trajectory different from the first trajectory is calculated and displayed on the monitor.

In another embodiment of the present invention, the numerical control device 14 in the third embodiment that has been described in relation to FIG. 5 may be modified such that the display part 54 only displays the program trajectory and the command trajectory. In other words, the program coordinate and the command coordinate are not displayed in this case. Similarly, the numerical control device 16 in the fourth embodiment that has been described in relation to FIG. 7 may be modified such that the display part 56 only displays the program trajectory, the command trajectory and the actual trajectory. In this case, the program coordinate, the command coordinate and the actual coordinate are not displayed on the monitor. In these variants, an operator can still visually and easily determine errors between two or three trajectories.

Although various embodiments of the present invention have been described above, it would be obvious for a person skilled in the art to combine any features of the embodiments explicitly or implicitly disclosed in the specification. Although examples in which the respective coordinates and the respective trajectories are displayed in a superimposed manner, the present invention is not limited to these particular embodiments. In other words, the respective coordinates and the respective trajectories may be displayed otherwise, as long as they can be compared with one another. For example, the program coordinate and the command coordinate may also be displayed in a side-by-side manner.

EFFECT OF THE INVENTION

According to the present invention, an operator can precisely evaluate accuracy in a machining process by taking into account changes in commands before and after interpolation, based on information displayed by the display part. Further, the operator can precisely evaluate accuracy in a machining process based on differences between a command and actual behavior. Furthermore, if errors occur in a shape formed by machining, the present invention facilitates analyzing the cause of errors by the operator.

Although the invention has been shown and described with exemplary embodiments thereof, it should be understood by those skilled in the art that the foregoing and various other changes, omissions and additions may be made therein and thereto without departing from the spirit and scope of the invention.

What is claimed is:

1. A numerical control device for controlling movement of a machining point by driving a plurality of drive shafts of a machine tool in accordance with a machining program, the device comprising:
   a program position obtaining part for obtaining a program position from the machining program, the program position representing positional information for each drive shaft;
   a command position obtaining part for obtaining a command position of each drive shaft, the command position being generated by interpolating the program position obtained from the machining program and being based on a machining condition which is specified by the machining program and parameters;
   a program coordinate calculating part for calculating a program coordinate based on the program position and on machinery information of the machine tool, the program coordinate representing a coordinate of the machining point corresponding to the program position;
   a program coordinate storing part for storing the program coordinate;
   a command coordinate calculating part for calculating a command coordinate based on the command position and the machinery information of the machine tool, the command coordinate representing a coordinate of the machining point corresponding to the command position;
   a command coordinate storing part for storing the command coordinate;
   an actual position obtaining part for obtaining an actual position of each drive shaft by detecting a position of each drive shaft;

an actual coordinate calculating part for calculating an actual coordinate based on the actual position and the machinery information of the machine tool, the actual coordinate representing a coordinate of the machining point corresponding to the actual position;

an actual coordinate storing part for storing the actual coordinate; and a display part for displaying the program coordinate and the command coordinate such that the program coordinate and the command coordinate can be compared with each other, wherein the display part is adapted to further display the actual coordinate such that the actual coordinate can be compared with the program coordinate and the command coordinate.

2. The numerical control device according to claim 1, further comprising:

a program trajectory generating part for generating a program trajectory by connecting the program coordinates with a predetermined shape; and a command trajectory generating part for generating a command trajectory by connecting the command coordinates with a predetermined shape, wherein the display part is adapted to further display the program trajectory and the command trajectory such that the program trajectory and the command trajectory can be compared with each other.

3. The numerical control device according to claim 2, further comprising a distance calculating part for calculating a distance between a first selected point on the program trajectory and a second selected point on the command trajectory, wherein the display part is adapted to further display the distance.

4. The numerical control device according to claim 2, further comprising a distance calculating part for calculating a distance along a perpendicular line which extends from a selected point on one of the program trajectory and the command trajectory to a point where the perpendicular line crosses the other trajectory, the selected point being selected by an external input device, wherein the display part is adapted to further display the perpendicular line and the distance.

5. The numerical control device according to claim 2, further comprising:

an actual trajectory generating part for generating an actual trajectory by connecting the actual coordinates with a predetermined shape, wherein the display part is adapted to further display the actual trajectory such that the actual trajectory can be compared with the program trajectory and the command trajectory.

6. The numerical control device according to claim 5, further comprising a distance calculating part for calculating a distance between a first selected point on a first trajectory selected from the program trajectory, the command trajectory and the actual trajectory by an external input device and a second selected point on a second trajectory different from the first trajectory, wherein the display part is adapted to further display the distance.

7. The numerical control device according to claim 5, further comprising a distance calculating part for calculating a distance along a perpendicular line which extends from a selected point on a first trajectory which is one of the program trajectory, the command trajectory and the actual trajectory selected by an external input device to a point where the perpendicular line crosses a second trajectory different from the first trajectory, wherein the display part is adapted to further display the perpendicular line and the distance.

8. A numerical control device for controlling movement of a machining point by driving a plurality of drive shafts of a machine tool in accordance with a machining program, the device comprising:

a program position obtaining part for obtaining a program position from the machining program, the program position representing positional information for each drive shaft;

a command position obtaining part for obtaining a command position of each drive shaft, the command position being generated by interpolating the program position obtained from the machining program and being based on a machining condition which is specified by the machining program and parameters;

a program coordinate calculating part for calculating a program coordinate based on the program position and on machinery information of the machine tool, the program coordinate representing a coordinate of the machining point corresponding to the program position;

a program coordinate storing part for storing the program coordinate;

a command coordinate calculating part for calculating a command coordinate based on the command position and the machinery information of the machine tool, the command coordinate representing a coordinate of the machining point corresponding to the command position;

a command coordinate storing part for storing the command coordinate;

an actual position obtaining part for obtaining an actual position of each drive shaft by detecting a position of each drive shaft;

an actual coordinate calculating part for calculating an actual coordinate based on the actual position and the machinery information of the machine tool, the actual coordinate representing a coordinate of the machining point corresponding to the actual position;

an actual coordinate storing part for storing the actual coordinate;

a program trajectory generating part for generating a program trajectory by connecting the program coordinates with a predetermined shape;

a command trajectory generating part for generating a command trajectory by connecting the command coordinates with a predetermined shape; and an actual trajectory generating part for generating an actual trajectory by connecting the actual coordinates with a predetermined shape, wherein the display part is adapted to display the program trajectory and the command trajectory such that the program trajectory and the command trajectory can be compared with each other, and wherein the display part is adapted to further display the actual trajectory such that the actual trajectory can be compared with the program trajectory and the command trajectory.

* * * * *